Feb 8, 1927.
M. J. HUGGINS
ELECTRIC INDICATING MEANS
Filed Nov. 7, 1924
1,617,287
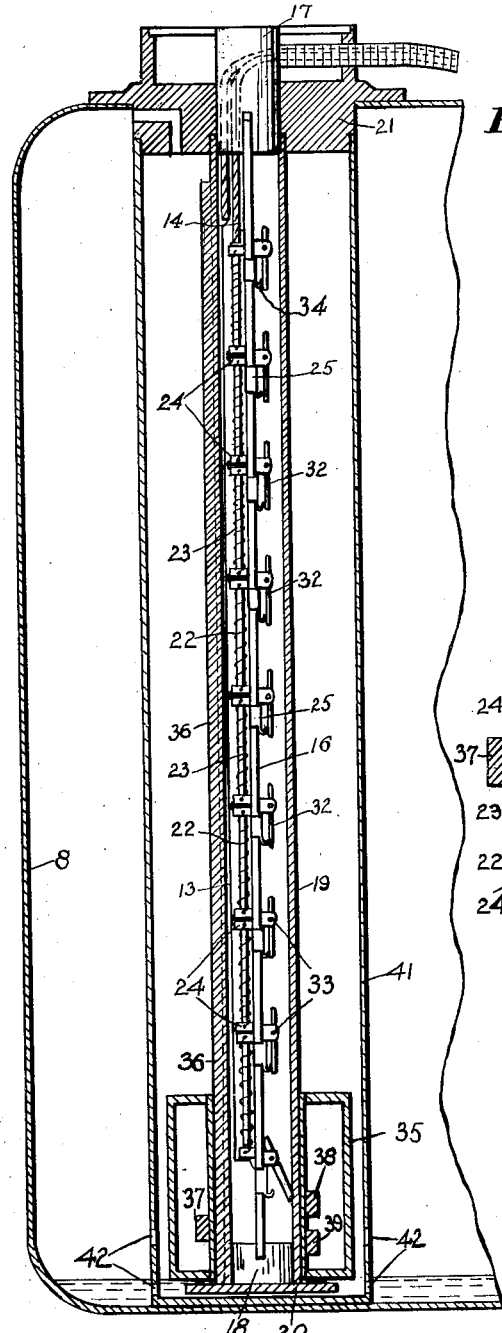
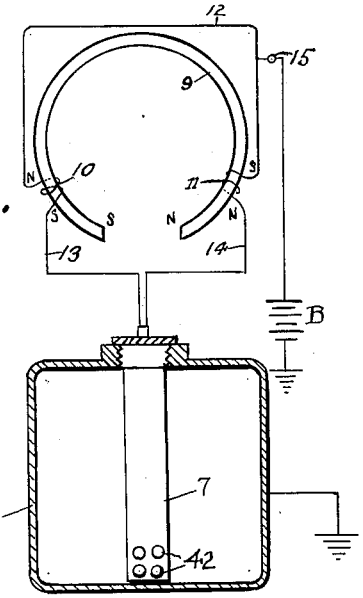
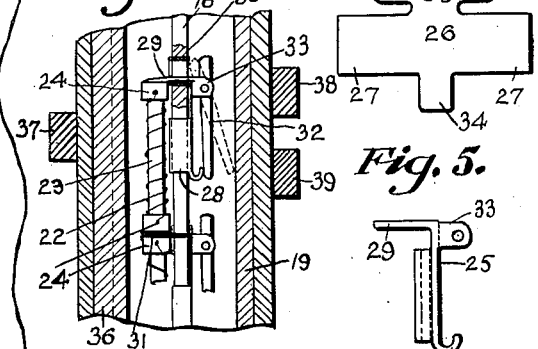
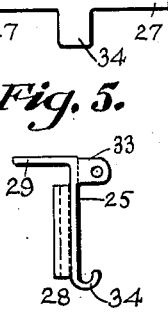
Inventor
Merion J. Huggins
By his Attorney John E. Seifert Patented Feb. 8, 1927.

1,617,287

UNITED STATES PATENT OFFICE.

MERION J. HUGGINS, OF UPPER SADDLE RIVER, NEW JERSEY, ASSIGNOR TO AUTO-METER CO., INC., OF NEW YORK, N. Y., A CORPORATION OF DELAWARE.

ELECTRIC INDICATING MEANS.

Application filed November 7, 1924. Serial No. 748,441.

This invention relates to electric indicating means embodying an electric indicating instrument to be connected in circuit with a source of electricity, such, for instance, as illustrated and described in my co-pending application Serial No. 723,241, including an indicator adapted to be variably positioned under the influence of a magnetic force or forces induced by the current flow, which forces are varied by and in accordance with variations in the strength of the current flow to indicate the voltage or amperage of the current, or to indicate the quantity of liquid in a tank, by introducing into or cutting out predetermined amounts of resistance from the circuit of the magnetic force generating means, and it is the object of the invention to provide improved current regulating means to introduce into or cut out of the circuit of the magnetic force generating means of an indicating instrument predetermined amounts of resistance, and to provide means of this character which is adapted to be connected with or inserted in a liquid carrying tank and controlled by the quantity of liquid in the tank and influencing the indicating instrument to indicate the quantity of liquid in the tank.

While the invention is adapted to various uses it is herein illustrated and described to indicate the quantity of gasolene in the gasolene storage tank of a motor vehicle. For this purpose, as illustrated and described in my application hereinbefore referred to, one element of the current flow regulating means for controlling the actuation of the instrument is carried by a float to rise and fall with the liquid level in the tank, and as the liquid is sloshed and surged about in the tank by the movement of the vehicle with a consequent constant introducing and cutting out of the current flow of the current regulating means it is difficult to procure a true reading of the instrument while the vehicle is in motion, and it is a further object of the invention to provide means to prevent any sudden movement of the float by the sloshing of the liquid in the tank.

In the drawing accompanying and forming a part of this specification, I have shown an embodiment of the invention wherein Figure 1 shows an electric resistance device mounted in a tank, the tank being in cross section, and showing in a diagrammatic manner the electrical hook up of the device with an electric indicating instrument.

Figure 2 is a longitudinal sectional view of the electric resistance device showing the same mounted in a liquid carrying tank, only a portion of the tank being shown.

Figure 3 is an enlarged sectional view of a portion of an electric resistance device and showing the manner of closing the circuit of and connecting the same with the source of electricity and different portions thereof in circuit with the indicating instrument.

Figure 4 is a fragmentary detail view in section of a float carrying a magnet operative to actuate a contact member to connect different portions of the resistance device in circuit with the indicating instrument.

Figure 5 is a side elevation of a contact carrier forming a part of the invention and through which the different portions of the resistance device are connected in circuit with the indicating instrument; and Figure 6 is an elevational view of a blank from which the contact carrier shown in Figure 5 is shown.

Similar characters of reference designate like parts through the different views of the drawing.

In carrying out the embodiment of the invention illustrated in the drawing the current flow regulating means arranged as a unitary structure is shown in a general way at 7 in Figure 1 as mounted in and suspended from an opening in the top of the storage tank 8 for gasolene and mounted on a convenient part of the vehicle, usually in the rear, the regulating means being electrically connected to an indicating instrument mounted upon the instrument board of the vehicle and a battery, shown in a conventional manner at B, that has one terminal grounded as in the frame of the vehicle. The indicating instrument may be of a suitable construction and arrangement, such for instance as that disclosed in my application hereinbefore referred to Serial No. 723,241, to which reference may be had, and there is shown in a diagrammatic manner in Figure 1 the electrical hook up of such an instrument in connection with the current flow regulating means of the present application. In said indicating instrument a polarized element 9 of ring or circular form is pivotally supported and arranged as an indicator, being provided with a graduated scale upon a peripheral portion thereof. Movement is imparted to such element through the influence of magnetic fields actuating thereon generated by a pair of coils 10, 11 having one terminal 12 connected to the battery B and the other terminals 13, 14, connected to the terminals of an electric current flow resistance element constituting a part of the current regulating means to be hereinafter described, which means also embodies a movable contact element which may be directly connected in circuit with the battery, but which in motor vehicle practice is grounded in the vehicle frame the same as the battery. While the current flow regulating means and instrument may be connected in a closed circuit with the battery, in order to conserve the electric energy this is shown as being a normally open circuit to be closed by a suitable circuit closer actuated by a push button 15.

The current regulating means comprises a member or carrier 16 of dielectric material, such as fiber or vulcanite, said member being in the form of a flat strip fixed at opposite ends in heads 17, 18 whereby it is mounted in a tubular member or housing 19 of current conducting but non-magnetizable material, such as brass, which heads serve to close the ends of said tubular conductor. Said tubular member has an additional flanged closure 20 at one end and is mounted at the opposite end in a closure cap 21, in which the head 17 also engaged, for an opening in the tank 8 and whereby the tubular member with the dielectric member is suspended in the tank to extend from the top to the bottom thereof.

An electric current resistance element is mounted on and carried by the dielectric member, said element comprising a plurality of coils of resistance wire 22 connected in series and extending longitudinally of the dielectric member. Each of the coils is wound about a carrier 23 of insulating material and electrically connected at the ends, as by spot soldering, to heads 24 of conducting material engaged upon the ends of the coil carriers. The coil carriers with the coils are electrically connected and mounted upon the dielectric member or carrier by supporting brackets 25 of conducting material (Figure 5) formed from a blank 26 (Figure 6). These stampings are arranged with intermediate and oppositely projected wings 27 to be folded to embrace the dielectric member, as shown at 28, with the brackets engaging at the side of the dielectric member opposite to the coils with a portion 29 bent at a right angle to the body extending through a perforation 30, which may be arranged with an eyelet of conducting material to engage between and in electrical connection with the heads of a pair of coil carriers and secured thereto as by soldering, as shown at 31. Different amounts of the resistance element are connected in an electric circuit through the tubular conductor 19 by contacts 32 formed up from sheet magnetizable material to channel shape in cross section, said contacts being pivotally supported between a pair of ears 33 of the brackets extending opposite to the angle portion 29, and through such support electrically connected with the coils. These contacts are so arranged and connected to the brackets 25 that they will normally assume a position by gravity with the one free end, the lower end, in engagement with a hook 34 formed on each of the brackets, as shown in Figures 2 and 3. The terminal of one coil at the end of the resistance element, in the present instance the lowermost coil, is electrically connected by the conductor 13 with the coil 10 of the indicating instrument, while the terminal of the coil at the opposite end of the resistance element is connected by the conductor 14 to the coil 11 of the indicating instrument. The windings of the coils 10, 11 and the connections thereof with the resistance element is such that the current flow through the coils is in opposite directions, whereby one coil will generate a magnetic field to exert a force upon and move the polarized element 9 in one direction, while the force of the magnetic field generated by the other coil will move the polarized element in reverse direction.

The resistance element is connected in an electric circuit and different portions or amounts thereof connected in circuit with the magnetic force generating coils 10, 11 of the indicating instrument through either one of said contacts 32 being brought into electrical connection with the tubular conductor 19, which is controlled by the level of the liquid in the tank. The contacts are moved into electrical connection with the tubular conductor 19 by the attractive force of a magnet 37 carried by a buoyant member or float 35 movable along the tubular conductor 19 with the rise and fall of the liquid level in the tank. The float in the present instance is of the hollow type having a core whereby it is slidably mounted on the tubular conductor and held against rotative movement relative to said conductor by a spline 36 extending longitudinally of the conductor engaging in a slot or keyway extending longitudinally through the float core, as clearly shown in Figures 2 and 3. The magnet 37 is in the form of a split ring with the opposite ends 38, 39, spread laterally out of circular alinement as shown, and the magnet positioned on the float core by a bracket 40 so that the legs of the magnet will come opposite that portion of the float where it is splined upon the tubular conductor 19 and opposite the movable contacts 32 whereby the attractive force will operate to draw a contact 32 to the tubular conductor when the magnet is positioned opposite to a contact, as shown in dotted lines in Figure 3.

Owing to the buoyancy of the float it will readily move along the tubular conductor with any rise and fall of the liquid level in the tank, and should the current regulating means be connected in a close circuit with the indicating instrument such liquid as it surges about in the tank due to the movement of the vehicle by which the tank is carried, the float will have sudden movements along the tubular conductor and a constant variable movement of the indicator with the result that during the movement of the vehicle it would be impossible to procure a correct reading as to the quantity of liquid in the tank from the indicating instrument due to this movement of the liquid in the tank, although while the vehicle was standing still a correct reading could be obtained. To obviate this sudden movement of the float by the sloshing and surging of the liquid in the tank an auxiliary float carrying chamber is provided in communication with the liquid in the tank and the liquid level in which chamber is at all times the mean liquid level in the tank without any possibility of such liquid changing with the varying liquid level in the tank due to the sloshing or surging of the liquid therein as above described. This chamber is arranged by means of a tube 41 secured at one end to the closure 21 carrying the current regulating means to extend around the housing or tubular conductor 19 and the float 35 mounted thereon, said tube being of a length to extend beyond the tubular conductor in close proximity to the bottom of the tank, preferably having said end closed as shown, and the chamber formed by such tube being in communication with the liquid in the bottom of the tank through circularly arranged ports 42.

The resistance element may be arranged and the indicating instrument calibrated to indicate the quantity of liquid in the tank by measure, that is in gallons, or to indicate the quantity of liquid in the tank by the liquid level therein. In the present instance the resistance element is arranged to influence the indicating instrument to indicate the liquid level in the tank, and indicate the capacity of the tank in eighths. For this purpose the resistance device is composed of eight coils 22 and nine contacts 32. Assuming the tank to be empty the lowermost contact 32 will be attracted to the tubular conductor 19 connecting all of the resistance element into the coil 11 and cutting out all of said element from the coil 10, and the strength of the current flow through the coils 10 and 11 will be such that the magnetic field generated by the coil 10 will exert a force upon the polarized element 9 to move said element against the force of the field generated by the coil 11 positioning said element and the indicator associated therewith to expose a symbol on the indicator indicative that the tank is empty. Should the liquid level in the tank be such that the float will be positioned with the magnet carried thereby opposite to and attract the intermediate or fifth contact 32 to the tubular conductor 19 equal portions of the resistance element will be connected in circuit with the coils 10, 11 when the force of the magnetic fields generated by the coils will be such as to maintain the polarized element 9 substantially in equilibrium and position the indicator to expose a symbol indicative that the tank is one-half full.

While I have illustrated and described the feature of the means for preventing the sudden movement of the magnet carrying buoyant member by the surging and sloshing of the liquid in the tank in connection with a particular construction and arrangement of an electric current regulating means and a particular form of electric indicating instrument, it is obvious that the same may be utilized with other forms of current regulating and indicating means and come within the scope of the invention, that portions of the invention may be used without others without departing from the scope of the invention, and that various modifications may be made in the construction and arrangement of parts and come within the scope of the invention.

Having thus described my invention I claim:

1. In electric current regulating means, a series of coil carriers, coils wound on said carriers, means to connect the coils in series, and contact members movably carried by said coil connecting means adapted to connect the regulating means in an electric circuit through either one of said contacts.

2. In electric current regulating means, a series of coil carriers, coils wound about said carriers, a dielectric support for said coil carries, means to mount the coil carriers upon the dielectric support and connect the coils in series, and contact members movably carried by said connecting means adapted to connect the regulating means in an electric circuit through either one of said contact members.

3. In electric current regulating means, a series of electrically connected coils, movable contact members electrically connected to the connection of the coils, and a housing of contacting material in which the coils and contacts are mounted in insulated relation thereto, said housing serving as a contact common to all of the movable contacts and through which housing and either one of the movable contacts the current regulating means may be connected in an electric circuit.

4. In electric current regulating means, a series of electrically connected coils, movable contact members electrically connected to the connection of the coils, a housing of conducting material in which the coils and contacts are mounted in insulated relation thereto and serving as a contact common to all of the movable contacts, and means movable along the housing to cause a contact to be moved and retained in contact with the housing to connect the current regulating means in an electric circuit through either one of said contact members.

5. In electric current regulating means, a series of electrically connected coils; movable contact members in electrical connection with the coils; a housing of conducting material in which the coils and contacts are mounted and insulated therefrom; and a magnet mounted on the housing to have movement along the same and adapted to attach either one of the contacts to the housing to connect the current regulating means in an electric circuit through either of said contacts.

6. In electric current regulating means, a series of coils; carriers for said coils, a dielectric support for the coil carriers; means to mount the coil carriers upon said dielectric support and electrically connect the coils in series; contact members movably carried by the connecting means of the coils; a housing of non-magnetizable but conducting material in which the dielectric support with the coils and contacts is mounted and insulated therefrom; and a magnet movable along the housing and adapted to attract the contact members to the housing to connect the current regulating means in an electric circuit through said contacts.

7. In electric regulating means, a coil; a carrier upon which the coil is wound; a dielectric support for the carrier; means to mount the coil upon said dielectric support; a movable contact connected to one terminal of the coil; an enclosure of conducting material for said dielectric support with the coil and contact mounted thereon, and said contact adapted to connect the coil in an electric circuit with said enclosure.

8. In electric current regulating means, an electric current resistance element, movable contacts of magnetizable material electrically connected to different portions of said element, a dielectric carrier for said element and contacts, a housing of conducting material for said carrier with the resistance element and contacts, and a magnet movable along the housing adapted to attract either one of the contacts to the housing to connect the resistance element in an electric circuit.

9. In electric current regulating means, an electric current resistance element having a series of movable contacts electrically connected to different portions thereof; a housing of conducting material in which said resistance elements and contacts are mounted and insulated therefrom and adapted to serve as a contact common to all of the movable contacts, a buoyant member movable along said housing and carrying means adapted to move the movable contacts into contact with the housing through magnetic attraction, a second housing in which the first housing with the buoyant member is enclosed, and means to mount and suspend said second housing with the current regulating means from an opening in a liquid carrying tank, and said second housing having openings for entrance of the liquid from the tank thereinto.

10. In electric current regulating means, the combination with a liquid carrying tank, of a float carrying housing suspended in the tank in communication with the liquid at the bottom of the tank, a tubular current conductor in said housing, a current resistance element having movable contacts electrically connected to different portions thereof carried in and insulated from the tubular current conductor, and a float mounted on said current conductor to have movement along the same and carrying means to move either one of the movable contacts into electrical connection with the tubular conductor to connect the resistance element in an electric circuit through either of said movable contacts.

11. In electric current regulating means, the combination with a liquid carrying tank, of a float carrying housing suspended in the tank in communication with the liquid at the bottom of the tank, a tubular current conductor in said housing, a current resistance element, movable contacts of magnetizable material electrically connected to different portions of said element, said element and the contacts being carried in and insulated from the tubular current conductor, a float in the housing to have movement along the tubular conductor, and a magnet carried by said float adapted to attract the magnetizable contacts to the tubular conductor to connect the resistance element in an electric circuit through either of said magnetizable contacts and tubular conductor.

12. In electric current regulating means, a tubular member of conducting but non-magnetizable material, a dielectric member in said tubular member, a resistance element comprising a plurality of coils connected in series, movable contacts of magnetizable material electrically connected to the terminals of a pair of coils, and adapted to make contact with the tubular conductor to connect the resistance element in an electric circuit through either of the coils, said contacts and coils being mounted upon the dielectric member, and a magnet movable along the tubular conductor and adapted to attract either of the magnetizable contacts to the movable conductor.

13. In electric current regulating means, a tubular member of conducting but non-magnetizable material, a dielectric member in said tubular member, a resistance element comprising a plurality of coils, means to electrically connect said coils and mount the same upon the dielectric member, contact members of magnetizable material pivotally carried by the coil connectors, and a magnet movable along the tubular conductor adapted to attract either one of the magnetizable contacts to the conductor to connect variable amounts of the resistance element in an electric circuit.

14. In electric current flow indicating means, a tubular member of conducting and non-magnetizable material, a dielectric member in said tubular member, a resistance element and a series of contacts of magnetizable material electrically connected to different portions of said element mounted on the dielectric member, and a magnet movable along the tubular conductor adapted to attract either one of the magnetizable contacts to said tubular conductor to connect the resistance element in an electric circuit, said magnet comprising a split ring with the ends arranged out of circular alinement.

15. In electric current flow indicating means, a tubular member of conducting and non-magnetizable material, a dielectric member in said tubular member, a resistance element and a series of contacts of magnetizable material electrically connected to different portions of said element mounted on the dielectric member, a split ring magnet with the ends spread laterally out of circular alinement, a hollow float movable along the tubular conductor, said magnet being mounted upon the core of and enclosed within the float to have movement therewith along the tubular conductor and adapted to attract either one of the magnetizable contacts to said tubular conductor to connect the resistance element in an electric circuit.

Signed at New York city, in the county of New York and State of New York, this 28th day of October, 1924.

MERION J. HUGGINS.